Sept. 26, 1950  C. ARMSTRONG  2,523,351
PLUMB BOB WITH MAGNETIC POINT
Filed Feb. 18, 1946
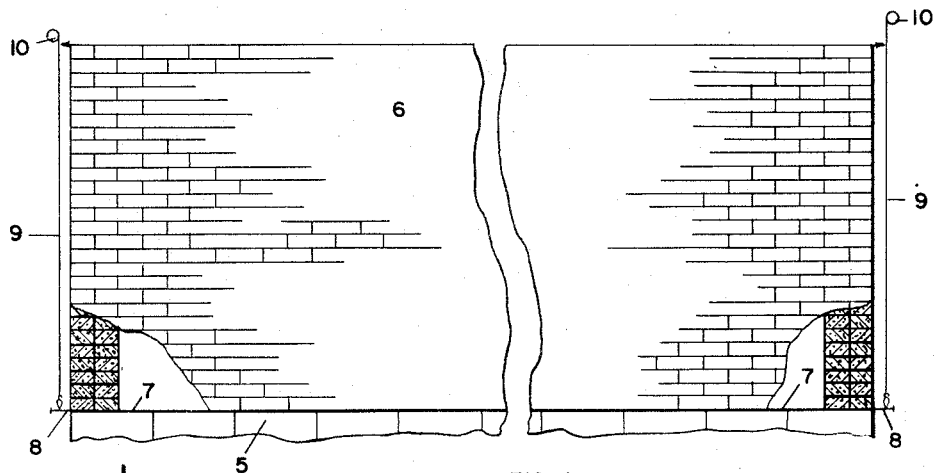
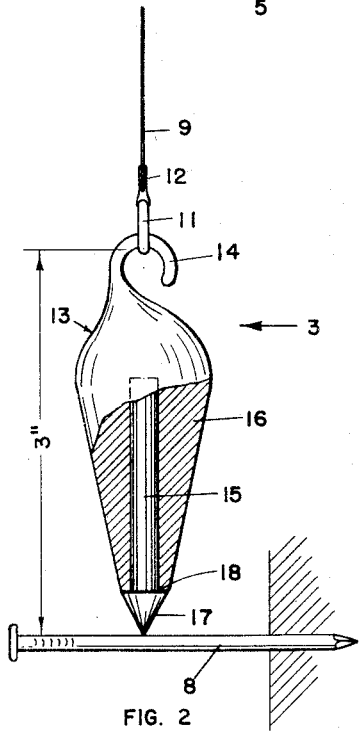
FIG. 2
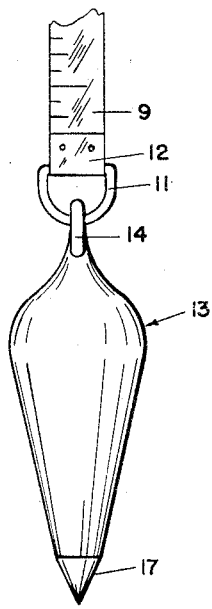
FIG. 3
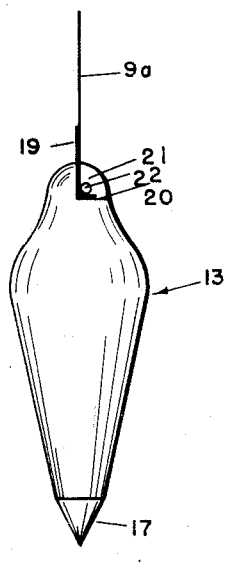
FIG. 4
*INVENTOR.*
CHARLES ARMSTRONG
BY
Martin E. Anderson
ATTORNEY

Patented Sept. 26, 1950

2,523,351

UNITED STATES PATENT OFFICE 2,523,351

PLUMB BOB WITH MAGNETIC POINT

Charles Armstrong, Denver, Colo., assignor of one-half to Gunnar O. Bedoar, Westwood, Colo.

Application February 18, 1946, Serial No. 648,444

3 Claims. (Cl. 33—216)

This invention relates to improvement in measuring devices and has reference more particularly to a device for measuring the elevation of a surface above a bench mark.

In the building of brick and other walls built from blocks, the mason must, from time to time, measure the height of the wall at the corners so as to be sure that the wall is being built equally high at all points.

It is the object of this invention to produce a measuring device by means of which a mason, being at the top of a brick or other masonry wall, can, without assistance, measure the exact height of the wall above a predetermined bench mark.

It has heretofore been customary, in order to make this measurement, for one person to be at the top of the wall and another on the ground, the latter holding the end of a tape at a predetermined mark. This method of measuring is time consuming as it necessitates some one either to come down from the wall to hold the end of the tape, or to be present on the ground during this measuring operation.

This invention, briefly described, consists in providing a bench mark whose upper surface is on the level with the floor or other point and which is formed from magnetic material. Cooperating with the bench mark is a measuring tape having at its lower end a weight in the form of a plumb bob, which is either formed entirely of a permanent magnet, or comprises a permanent magnet enclosed partially in an outer covering of nonmagnetic material. Such a measuring device can be lowered by the mason until it comes into contact with the bench mark and then gradually raised until the lower end of the magnet contacts the upper surface of the bench mark.

Having thus set out the objects of the invention and in a general way described the invention itself, the latter will now be described in greater detail and for this purpose reference will be had to the accompanying drawing in which the invention has been illustrated in its preferred form, and in which:

Figure 1 is a side elevation of a brick wall with parts thereof broken away showing the measuring device in position to determine the height of the wall from a bench mark of predetermined level;

Figure 2 is a side elevation of a plumb bob comprising a permanent magnet, parts of which have been broken away and shown in section;

Figure 3 is a side elevation looking in the direction of arrow 3, in Figure 2; and Figure 4 shows a slightly modified form of the invention.

In the drawing reference numeral 5 designates a foundation wall which may be of stone, cinder blocks or concrete and reference numeral 6 designates a brick wall of ordinary construction. A portion of the wall has been broken away to show the level of the floor which has been designated by reference numeral 7. When the wall is started and after the first course of brick has been laid, a spike, such as a 20 or 30 penny spike 8 is positioned in the mortar at the level of the floor or at any other level. The spike serves as a bench mark and in the present embodiment it must be of magnetic material such, for example, as is commonly used in nails and spikes, namely, soft iron or steel.

After the wall has been built upwardly to some extent, it is customary to take measurements at the corners to find whether or not the upper surface of the wall is being maintained the same distance from the bench marks at all corners.

Heretofore, whenever such measurements have been taken, the person at the top of the wall has let down a measuring tape, such as that designated by reference numeral 9 and a person at the bottom has held the end of the tape against a predetermined bench mark on the wall surface. Such measurements, as above indicated, require the services of two men and often times one of the masons must climb down from the top of the wall to assist in taking this measurement.

With the measuring device that forms the subject of this invention, a mason can, by himself, make correct measurements of the height from his position at the top of the wall, and this is accomplished by a device constructed as follows: The measuring tape and the housing 10, with which it is usually provided, are of the ordinary construction and in Figures 2 and 3 a fabric tape has been shown. Such tapes are usually provided at one end with ring 11, that has one straight side that passes through a metal loop 12 secured to the lower end of the tape. Attached to the loop at the lower end of the tape is a plumb bob, which has been designated in its entirely by reference numeral 13. The upper end of the plumb bob is provided with a hook 14 that can be inserted into the loop in ring 11 as shown clearly in Figures 2 and 3. The plumb bob is provided with a core 15 which comprises a permanent magnet, preferably one of the powerful magnets now constructed from an alloy of iron and aluminum. The outer covering of the permanent magnet, which has been designated by reference numeral 16, is made from some nonmagnetic material, such as lead, zinc, brass or copper or it may be made from a synthetic material or from hard rubber, in fact any material can be used that is nonmagnetic and which has the desired density. The lower end of the permanent magnet, which has been designated by reference numeral 17, has been shown as conical, terminating in a fairly sharp point. One of the reasons for making the end of the permanent magnet conical is to concentrate the magnetic flux as a stronger pull results from a greater density. The bench mark 8, comprising an ordinary spike, is positioned as shown in the drawing.

Let us now assume that the mason has attached the magnetic plumb bob to the end of his measuring tape. The tape is let down until the bob is below the bench mark, after which the tape is moved into contact therewith. The tape and the plumb bob are now moved upwardly, the parts being in such relation that the plumb bob will slide along the nail or bench mark. When the bob approaches a position like that shown in Figure 2, the attraction of the magnetism will hold it against the nail and when the point comes to the top of the nail, the magnetic pull will be the greatest. The mason at the top of the wall can readily judge, by the increased resistance, when the plumb bob has reached the position shown in Figure 2 and he then takes his measurements, after which the tape is rolled back into the housing and the plumb bob detached. It is evident that this plumb bob can also be used in the manner of any ordinary plumb bob to hold a line vertical.

Particular attention is called to the streamlining of the upper end of the plumb bob as this prevents the parts from becoming interlocked with the bench mark when the plumb bob is moved upwardly.

Of course the entire plumb bob may be made of the proper kind of material to form a permanent magnet, if desired; however, as such a magnet is expensive and has no advantage over the present construction, it is believed that any ordinary bar magnet is preferable. In the drawing the lower end of the bar magnet has been shown as provided with a shoulder 18; however, this is not essential, but gives greater strength to the covering material than if tapered to a thin edge.

In Figure 4 a slightly modified form of the invention has been shown. The difference resides in the construction provided to effect a connection with the free end of a steel tape 9a. Such tapes are usually provided at their free ends with an L-shaped plate 19, the short side 20 of which serves to anchor the tape to a stationary object when taking measurements. In order to effect connection between a plumb bob and such a tape, the plumb bob is provided with an angular cutout 21 and a pin 22, the tape is pushed in sidewise until it assumes the position shown in Figure 4. The plumb bob is given such an outline that it will not catch on the nail during the upward movement of the bob.

In the present embodiment the distance from the top of the bench mark to the lower inner surface of ring 11, or the upper inner surface of hook 14 is assumed to be three inches and this distance must therefore be added to the reading on the tape when taking measurements. Of course it is permissible to have a specially constructed tape whose graduations are so positioned that the point of contact between the hook and the ring is equal to three inches or the length of the plumb bob between corresponding points.

In the drawing the magnet has been shown as a bar magnet having poles at the opposite ends. This is believed to be a preferable construction as it is very simple and such a permanent magnet can readily be either molded in position or inserted in a drilled opening in the body of the plumb bob.

It is well known that a U-shaped magnet has a greater pull than a bar magnet because both of the poles act simultaneously on the armature and if it is found desirable an elongated U-shaped magnet can be substituted for the bar magnet shown in the drawing. The lower end of the magnet can also be made more obtuse than shown in the drawing as there is no particular advantage in having the magnet terminate in a very sharp point.

Having described the invention what is claimed as new is:

1. A plumb bob for use in measuring the vertical distance from an elevated point to a bench mark of magnetic material positioned therebelow, comprising, a permanent magnet having a point at one end, a covering of nonmagnetic material, fixedly secured to the magnet, the upper end of the covering being formed to provide means for attaching the covering directly to the end of a flat measuring tape, the covering being shaped between the attaching means and the magnet point to prevent catching of the plumb bob on the magnetic material as the plumb bob is moved across it, the lower end of the magnet being exposed and the upper end terminating within the cover.

2. A plumb bob in accordance with claim 1 wherein the covering is formed at its upper end in the shape of an open hook for receiving the loop on the end of a tape.

3. A plumb bob in accordance with claim 1 wherein the covering is formed at its upper end to receive an angular end of a tape.

CHARLES ARMSTRONG.

REFERENCES CITED

The following references are of record in the file of this patent:

UNITED STATES PATENTS

| Number | Name | Date |
| --- | --- | --- |
| 432,896 | Porter | July 22, 1890 |
| 512,381 | Keyes | Jan. 9, 1894 |
| 918,869 | Larsen | Apr. 20, 1909 |
| 1,336,289 | Fagrie | Apr. 6, 1920 |
| 2,166,024 | Schmidt | July 11, 1939 |